Patented Apr. 21, 1953

2,636,047

UNITED STATES PATENT OFFICE 2,636,047

TREATMENT OF HYDROCARBON MIXTURES TO ADAPT THEM FOR OXIDATION

George Riethof and George P. Brown, Jr., Pittsburgh, Pa., assignors to Gulf Research & Development Company, Pittsburgh, Pa., a corporation of Delaware No Drawing. Application October 3, 1949, Serial No. 119,394

9 Claims. (Cl. 260—451)

1

This invention relates to the treatment of hydrocarbon mixtures; more particularly the invention relates to a process of treating heavy oils and waxes, especially waxy oils, so as to adapt the mixtures for effective oxidation.

The invention in its broad aspects comprises subjecting any heavy hydrocarbon mixture to the treatment described hereinafter as we have found that the susceptibility to oxidation of even refined mixtures, such as refined paraffin wax, is improved by the treatment. However, the process of the invention is especially valuable when applied to hydrocarbon mixtures which are difficult or impossible to oxidize with the use of an oxygen-containing gas such as air in the absence of a catalyst.

It is known that waxes, waxy oils and similar heavy hydrocarbon mixtures react differently when subjected to oxidation with air, depending upon the source and method of preparation of the mixture and whether or not a catalyst is employed. A highly refined wax such as paraffin wax, for example, can be oxidized without a catalyst fairly readily to desired oxidation products if a high enough temperature is employed while other waxes and oils do not respond at all, or at any rate, only with difficulty to oxidation with air. Thus, in the case of the cruder waxes and oils, the treatment with air at a suitable temperature results in the production of oxidation products at best only after the treatment has been continued for a substantial period of time.

We believe that in the case of the waxes and oils that are substantially non-oxidizable with air alone under the usual conditions of air rate and temperature, at least over any feasible period of time, the non-oxidizable nature of the wax or oils is the result of the presence therein of compounds of undetermined composition which inhibit the oxidation of the remainder of the compositions. There is reason to believe also that oxidation inhibitors are present in small amount even in highly refined naturally-occurring hydrocarbon mixtures. It has also been postulated in the case of the compositions that are oxidizable with air alone only after extended treatment and/or with the use of high temperatures, that during the contact of the composition with air in the initial stage, which has been called an induction period, the principal effect of the air is to convert into an inactive form compounds which are effective to inhibit oxidation. The oxidation of these waxes and oils that are difficulty oxidizable with air alone has not been regarded as an attractive process because of the long time or high temperatures required to obtain moderately satisfactory oxidation.

It has been proposed to employ catalysts in the oxidation of waxes and oils containing natural oxidation inhibitors and the use of catalysts is effective to shorten the so-called induction period in the oxidation of the better materials and to make possible the oxidation of the waxes and oils that are substantially non-oxidizable with air alone. Catalysts, however, have the disadvantage of affecting the direction of oxidation and in many cases making it very difficult to control. Further, the products frequently are contaminated with varying amounts of the catalyst employed. In addition it is often very difficult to recover the catalysts in usable form.

The present invention is concerned with the oxidation of heavy hydrocarbon mixtures such as heavy oils and waxes, and especially oily waxes or waxy oils. The invention is particularly concerned with the treatment of waxes and oils that are substantially non-oxidizable or at least difficult to oxidize with air alone. It has been discovered in accordance with the invention that by treating a heavy hydrocarbon mixture with a pentavalent vanadium compound preferably vanadium pentoxide or vanadyl vanadate, under substantially non-oxidizing conditions, the mixture is adapted for rapid and effective oxidation by the use of air, oxygen, or other oxygen-containing gas. Thus, following the pretreatment, the hydrocarbon mixture may be contacted with air under the usual oxidizing conditions and the oxidation begins almost immediately and proceeds rapidly to the desired stage of completion. Since the actual oxidation is preferably carried out in the absence of a catalyst, difficulties of control are avoided and the dangers of overoxidation and the formation of undesired oxidation products are appreciably reduced. While the invention is not limited to any theory of operation, we have reason to believe that the pretreatment is effective to render the natural oxidation inhibitors inactive.

Although there is no, or very little, actual oxidation of the hydrocarbon mixture, it is possible that the oxidation inhibitors are in fact destroyed by an oxidizing effect of the vanadium compound. Thus, in speaking of non-oxidizing conditions, we do not intend to exclude any oxidation, if such occurs, due to the action of the vanadium compound as an oxidizing agent. If the vanadium compound does destroy the oxidation inhibitors by oxidation, it is clear that this effect is not ordinary oxidation as we have found that a similar effect is not obtained by subjecting a hydrocarbon mixture difficult to oxidize with air alone, to high temperature oxidation with air so as to increase appreciably the saponification number. In the latter case the partially oxidized mixture is capable of being further oxidized only if subjected to treatment with air at high temperatures and for excessively long periods of time.

When practicing the process in accordance with a preferred embodiment, the pentavalent vanadium compound is separated from the wax or oil following the pretreatment under nonoxidizing conditions. We have found that vanadium pentoxide which has been employed for pretreatment of such a hydrocarbon mixture, while somewhat reduced in effectiveness, is entirely satisfactory for the pretreatment of additional batches of the hydrocarbon mixture. Thus one embodiment of the process comprises pretreating a plurality of batches of such a mixture in the presence of a pentavalent vanadium compound, revivifying the vanadium compound by oxidation with an oxygen-containing gas such as air, and employing the revivified vanadium compound for pretreatment of an additional plurality of batches of the hydrocarbon mixture.

The process of the invention can be employed with advantage for the treatment of any heavy hydrocarbon mixture containing natural oxidation inhibitors; that is, a hydrocarbon mixture having an initial boiling point above about 400° F. The mixtures of interest as raw materials in the present process are naturally occurring mixtures or mixtures produced in commercial operations. Such mixtures are referred to generally as industrial mixtures as distinguished from especially prepared mixtures of pure hydrocarbons which are more or less laboratory curiosities. Industrial mixtures are most frequently obtained from petroleum sources and include crude waxes, oily waxes and waxy oils such as are produced as by-products in the manufacture of paraffin waxes and the dewaxing of lubricating oils and are principally employed at the present time as components of fuels. The term "oily wax" denotes a mixture of an oil and a wax which contains wax components in solution and suspension at atmospheric or higher temperatures. An example is foots oil, an oily wax which is obtained in the sweating of slack wax formed from a wax distillate. When this wax is subjected to air oxidation under the usual conditions, no perceptible oxidation takes place over a period of more than twenty hours. While it is possible that some oxidation could be accomplished by continuing the introduction of air for a period of hundreds of hours, such an operation is obviously of no practical interest. Other examples of by-product materials which are difficult or impossible to oxidize with air alone are the liquid to semi-solid to solid waxy materials which are obtained by solvent dewaxing a lubricating oil fraction of a crude oil, which fraction has previously been subjected to a deasphalting operation. By subjecting these oily waxes to a pretreatment with vanadium pentoxide under substantially non-oxidizing conditions, they are rendered readily susceptible to effective and easily controlled oxidation with air.

The present process can be carried out efficiently on the batch principle by mixing the hydrocarbon mixture in liquid phase with the vanadium compound and agitating the resulting mixture at an elevated temperature. The agitation is employed in order to assure intimate contact of the oil with the compound. Experimental work leading to the development of the present invention has indicated that the quantity of vanadium compound, the temperature, and the time of treatment are more or less dependent factors. For example, relatively small quantities of the vanadium compound can be employed provided the temperature is raised or the time of treatment increased. However, since the vanadium compound is recovered in the process, we prefer to employ an amount of vanadium compound corresponding to at least 3 per cent vanadium pentoxide based on the weight of the hydrocarbon mixture and no advantage is gained by the use of more than an amount corresponding to about 10 per cent vanadium pentoxide. Our work has indicated that the temperature of pretreatment should be at least 100° C. and that most efficient results are obtained at temperatures above 150° C. While higher temperatures may be used, no advantages are obtained by operating substantially above 200° C. and accordingly, the preferred temperature range is from about 150° to about 200° C. and especially about 175° C. It is obvious that the temperature should not be so high as to cause substantial cracking of the hydrocarbon mixture subjected to treatment, as that would in effect destroy the mixture.

The time required for effective pretreatment may be determined in any given case by periodically subjecting a withdrawn sample to oxidation with air. In general, however, it has been found that satisfactory pretreatment is accomplished in batch operation in about one to five hours.

As previously stated, the pretreatment with the vanadium compound is carried out under substantially non-oxidizing conditions. In view of the above discussion regarding the possible oxidizing effect of the vanadium compound, it will be understood that by this it is meant that the hydrocarbon mixture containing the vanadium compound is not contacted with an oxidizing agent such as air in a manner to cause any substantial oxidation. While the pretreatment is efficiently accomplished in the complete absence of air, for example in a closed vessel containing an inert gas atmosphere, it is not necessary to take these precautions as excellent results are obtained by agitating the mixture in contact with the atmosphere. We have found that under these conditions, no or very little oxidation of the mixture occurs and that this minor amount of oxidation does not materially affect the efficiency of the process.

In order that the invention may be understood more fully, reference should be had to the following specific examples which will serve to further illustrate the invention.

Example I 100 parts by weight of foots oil were mixed intimately with 5 parts by weight of purchased vanadium pentoxide which was obtained in the form of coarse particles. This mixture was agitated at a variable temperature within the range of 170° to 180° C. by means of a mechanical stirrer in a vessel open to the atmosphere for a period of about 2½ hours. The mixture was then filtered to remove the vanadium pentoxide. The saponification number of the oil indicative of the extent of oxidation, was determined and found to be 2.5, establishing that substantially no oxidation had occurred. The treated oil was then subjected to oxidation by passing air through the oil at a rate of 30 cubic feet of air per hour per kilogram of oil for 4½ hours while maintaining the temperature of the mixture substantially constant at about 180° C. At this point the saponification number of the oxidized product was determined. The saponification number was found to be 153.8, establishing that effective oxidation had occurred. The oxidized material was a valuable source of higher fatty acids.

In another experiment, foots oil without pretreatment was subjected to air oxidation substantially as described above. After twenty hours, the saponification number had risen only to 8.7. The operation was discontinued as of no practical interest. This experiment does establish, however, that a small amount of oxidation with air does not prepare foots oil for effective further air oxidation.

*Example II*

This example illustrates the embodiment of the invention comprising the use of vanadium pentoxide for pretreating a plurality of batches of an oily wax. The vanadium oxide recovered from the foots oil as described in Example I was employed for the pretreatment of four additional batches of foots oil, each 100 parts by weight, in the manner described in that example and each pretreated batch was oxidized under the conditions given in Example I. Similarly, five other batches of foots oil were pretreated and oxidized as described in Example I but using a different purchased vanadium pentoxide which was supplied in the form of fine particles. The results are given in the following table, the coarse vanadium pentoxide being referred to as vanadium oxide A and the fine vanadium oxide as vanadium oxide B.

| Batch | Treatment | Vanadium Oxide A Saponification No. Following Treatment | Vanadium Oxide B Saponification No. Following Treatment |
|---|---|---|---|
| 1 | Pretreatment | 2.5 | 2.8 |
|   | Air Oxidation | 153.8 | 190.6 |
| 2 | Pretreatment | 5.2 | 8.0 |
|   | Air Oxidation | 116.8 | 143.1 |
| 3 | Pretreatment | 2.1 | 2.5 |
|   | Air Oxidation | 105.7 | 144.3 |
| 4 | Pretreatment | 3.9 | 2.1 |
|   | Air Oxidation | 84.3 | 136.8 |
| 5 | Pretreatment | 1.8 | 2.5 |
|   | Air Oxidation | 81.5 | 116.9 |

The results given in the table show that while the activity of vanadium pentoxide for pretreatment decreases with succeeding batches, it is effective for five batches of the oil. The saponification number of the later batches could be raised to that of the first batch simply by increasing the time of air oxidation.

*Example III*

This example is concerned with the pretreatment and air oxidation of a semi-hard wax obtained in the solvent dewaxing of a previously deasphalted lubricating oil fraction of an East Texas crude, under conditions similar to those described in Example I except for the use of 7 parts by weight of vanadium pentoxide for each 100 parts by weight of the wax and a time of pretreatment of 4½ hours. The product obtained by oxidation with air contains a high proportion of valuable higher fatty acids. Without the above-described pretreatment this same wax was not oxidized to any appreciable extent after 10 hours at 180° C. in the presence of the same amount of air.

It will be understood that the foregoing examples are merely illustrative of the invention and that effective oxidation of other hydrocarbon mixtures containing natural oxidation inhibitors can be accomplished by employing the procedures described in the examples. While the oxidation conditions employed in the examples have been found to be satisfactory, it will be understood that other conditions of oxidation may be employed since it appears that the pretreatment is effective to adapt the hydrocarbon mixture for use as a starting material for any of the conventional oxidation methods. Also, in place of vanadium pentoxide other pentavalent vanadium compounds such as vanadyl vanadate or other vanadates can be used.

For small and medium scale operation of the present process, the batch methods described are entirely satisfactory. The process, however, is adapted for operation on the continuous principle and a continuous process is generally preferred for large scale work. The process can be carried out continuously by disposing a quantity of vanadium pentoxide in each of two pretreatment vessels. The wax or oil is then flowed in contact with the catalyst in one vessel until the activity of the vanadium pentoxide has been reduced to the desired minimum and then the flow of oil is directed into the other vessel containing vanadium pentoxide. The flow of oil in contact with the first quantity of oxide should be discontinued at or before the amount of oil contacting the oxide corresponds to 100 parts by weight of oil for an amount of oxide corresponding to 0.6 part by weight of vanadium pentoxide. The vanadium pentoxide in the first vessel can then be regenerated easily by contacting it with a flowing stream of air at an elevated temperature. If desired, the regeneration can be carried out by suspending the spent vanadium compound in a stream of oil or molten wax and then contacting with air. The operation of the process in this way does not create equipment problems as ordinary steel vessels can be employed. Since little or no oxidation of the wax or oil takes place during the pretreatment, the corrosive acids which are formed during oxidation are not produced. This is also true with respect to equipment employed in batch operation which may also be constructed of ordinary steel.

Obviously many modifications and variations of the invention, as hereinbefore set forth, may be made without departing from the spirit or scope thereof and therefore only such limitations should be imposed as are indicated in the appended claims.

We claim:

1. A process comprising intimately contacting foots oil with a pentavalent vanadium compound at an elevated temperature of at least 100° C. under substantially non-oxidizing conditions, separating the vanadium compound from the resulting treated foots oil, and oxidizing said treated foots oil by passing a stream of an oxygen-containing gas through said oil at an elevated oxidation temperature.

2. A process comprising intimately contacting foots oil with vanadium pentoxide at an elevated temperature of at least 150° C. under substantially non-oxidizing conditions, separating the vanadium pentoxide from the resulting treated foots oil, and oxidizing said treated foots oil by passing a stream of air through said oil at an elevated oxidation temperature.

3. A process comprising intimately contacting foots oil with vanadium oxide in the amount of about 3 to about 10 per cent by weight of said foots oil at an elevated temperature between about 150° and about 200° C. under substantially non-oxidizing conditions, separating the vanadium pentoxide from the resulting treated foots oil, and oxidizing said treated foots oil by passing a stream of air through said oil at an elevated oxidation temperature.

4. A continuous process of treating a heavy hydrocarbon mixture to adapt said mixture for air oxidation which comprises alternately flowing a stream of said mixture in liquid phase through a first reaction zone and through a second reaction zone, said mixture being flowed through said first reaction zone in contact with a body of vanadium pentoxide at a temperature of at least 150° C. and under substantially non-oxidizing conditions until a total of about 100 parts by weight of said mixture has contacted not less than 0.6 part by weight of vanadium pentoxide, then diverting said stream of said mixture to flow said mixture in contact with a body of vanadium pentoxide in said second reaction zone at a temperature of at least 150° C. and under substantially non-oxidizing conditions until a total of about 100 parts by weight of said mixture has contacted not less than 0.6 part by weight of vanadium pentoxide, revivifying said body of vanadium pentoxide in said first reaction zone by contact with air while said stream of said mixture is being flowed in contact with the body of vanadium pentoxide in said second reaction zone, and repeating said process.

5. A continuous process of treating foots oil to adapt said oil for air oxidation which comprises alternately flowing a stream of said oil in liquid phase through a first reaction zone and through a second reaction zone, said oil being flowed through said first reaction zone in contact with a body of vanadium pentoxide at a temperature of about 150° C. to about 200° C. and under substantially non-oxidizing conditions until a total of about 100 parts by weight of said oil has contacted not less than 0.6 part by weight of vanadium pentoxide, then diverting said stream of said oil to flow said oil in contact with a body of vanadium pentoxide in said second reaction zone at a temperature of about 150° C. to about 200° C. and under substantially non-oxidizing conditions until a total of about 100 parts by weight of said oil has contacted not less than 0.6 part by weight of vanadium pentoxide, revivifying said body of vanadium pentoxide in said first reaction zone by contact with air while said stream of said oil is being flowed in contact with the body of vanadium pentoxide in said second reaction zone, and repeating said process.

6. A process comprising intimately contacting a heavy hydrocarbon mixture with a pentavalent vanadium compound at an elevated temperature of at least 100° C. under substantially non-oxidizing conditions, separating the vanadium compound from the resulting treated hydrocarbon oil and oxidizing said treated hydrocarbon oil by passing a stream of an oxygen-containing gas through said oil at an elevated oxidation temperature.

7. A process in accordance with claim 6 in which said heavy hydrocarbon mixture is contacted with said pentavalent vanadium compound at an elevated temperature between about 100° and 200° C.

8. A process in accordance with claim 7 in which said pentavalent vanadium compound is vanadium pentoxide.

9. A process in accordance with claim 6 in which said heavy hydrocarbon mixture is selected from the group consisting of waxes and oily waxes that are difficult to oxidize with air.

GEORGE RIETHOF.
GEORGE P. BROWN, Jr.

References Cited in the file of this patent
UNITED STATES PATENTS

| Number | Name | Date |
|---|---|---|
| 1,697,262 | Ellis | Jan. 1, 1929 |
| 2,003,584 | Dietrich et al. | June 4, 1935 |
| 2,156,266 | Murphree et al. | May 2, 1939 |
| 2,413,868 | Frey | Jan. 7, 1947 |

FOREIGN PATENTS

| Number | Country | Date |
|---|---|---|
| 386,715 | Great Britain | Jan. 29, 1933 |